United States Patent
Turolla et al.

(10) Patent No.: US 11,852,010 B2
(45) Date of Patent: Dec. 26, 2023

(54) METHOD FOR ESTIMATING A PORE PRESSURE VALUE IN GEOLOGICAL FORMATIONS TO BE DRILLED BY A DRILLING APPARATUS

(71) Applicant: ENI S.P.A., Rome (IT)

(72) Inventors: Axel Turolla, Venice (IT); Paolo Ferrara, San Donato Milanese (IT)

(73) Assignee: ENI S.P.A., Rome (IT)

( * ) Notice: Subject to any disclaimer, the term of this patent is extended or adjusted under 35 U.S.C. 154(b) by 241 days.

(21) Appl. No.: 17/273,871

(22) PCT Filed: Sep. 13, 2019

(86) PCT No.: PCT/IB2019/057728
§ 371 (c)(1),
(2) Date: Mar. 5, 2021

(87) PCT Pub. No.: WO2020/053822
PCT Pub. Date: Mar. 19, 2020

(65) Prior Publication Data
US 2021/0324731 A1  Oct. 21, 2021

(30) Foreign Application Priority Data
Sep. 14, 2018 (IT) .......... 102018000008613

(51) Int. Cl.
*E21B 47/06* (2012.01)
*E21B 47/16* (2006.01)
(Continued)

(52) U.S. Cl.
CPC .......... *E21B 47/06* (2013.01); *E21B 47/0224* (2020.05); *E21B 47/16* (2013.01);
(Continued)

(58) Field of Classification Search
CPC .......... E21B 47/06; E21B 47/16; E21B 10/42; E21B 10/00; E21B 47/0224; E21B 49/006; G01V 1/306; G01V 2210/6248
See application file for complete search history.

(56) References Cited

U.S. PATENT DOCUMENTS

| | | |
|---|---|---|
| 5,128,866 A | 7/1992 | Weakley |
| 2002/0159332 A1 | 10/2002 | Thomann et al. |

(Continued)

FOREIGN PATENT DOCUMENTS

| | | |
|---|---|---|
| CA | 2794094 A1 | 4/2014 |
| CN | 101025084 A | 8/2007 |

(Continued)

OTHER PUBLICATIONS

International Search Report dated Dec. 13, 2019 re: Application No. PCT/IB2019/057728, pp. 1-4, citing: WO 2014/111846 A1, WO 02/31538 A1, US 2007/0285274 A1 and CA 2 794 094 A1.

(Continued)

*Primary Examiner* — Brad Harcourt
(74) *Attorney, Agent, or Firm* — CANTOR COLBURN LLP

(57) ABSTRACT

A method for estimating an anomalous pore pressure value at depth level of a first discontinuous interface between a first geological formation and a second geological formation to be drilled by means of a drilling apparatus comprising at least one bit, where said method is implemented by means of a system comprising at least one electro-acoustic transducer (20) mounted with said bit, at least one memory for containing observable data and at least one control processor for processing observable data contained in said at least one memory, where said at least one processor controls transmitting a signal transmitted at a given frequency, said at least one electro-acoustic transducer receives a received signal that said at least one processor records in said at least one (Continued)

memory, comparing it with pre-loaded observable data in said at least one memory and estimating the value of the anomalous pore pressure of the first discontinuous interface.

15 Claims, 9 Drawing Sheets

(51) Int. Cl.
  *G01V 1/30* (2006.01)
  *E21B 47/0224* (2012.01)
  *E21B 10/42* (2006.01)

(52) U.S. Cl.
  CPC .............. *G01V 1/306* (2013.01); *E21B 10/42* (2013.01); *G01V 2210/6248* (2013.01)

(56) References Cited

U.S. PATENT DOCUMENTS

| 2007/0285274 A1 | 12/2007 | Esmersoy |
| 2008/0164062 A1 | 7/2008 | Brackin et al. |
| 2010/0050762 A1 | 3/2010 | Nold, III et al. |
| 2011/0141847 A1* | 6/2011 | Frumin ................. E21B 49/006 367/35 |
| 2015/0361790 A1* | 12/2015 | Ferrara ................... E21B 10/00 367/35 |
| 2017/0292376 A1* | 10/2017 | Kumar .................... E21B 10/08 |
| 2019/0101660 A1* | 4/2019 | Johnson ................. G01V 1/307 |
| 2019/0250295 A1* | 8/2019 | Goodman ................ G01H 5/00 |

FOREIGN PATENT DOCUMENTS

| CN | 103547944 A | 1/2014 |
| GB | 2462911 A | 3/2010 |
| WO | 0231538 A1 | 4/2002 |
| WO | 2014066981 A1 | 5/2014 |
| WO | 2014111846 A1 | 7/2014 |

OTHER PUBLICATIONS

Written Opinion dated Dec. 13, 2019 re: Application No. PCT/IB2019/057728, pp. 1-6, citing: WO 2014/111846 A1.
EA Office Action dated Oct. 7, 2021 re: Application No. 202190448, pp. 1-4, citing: US 2008164062 A1.
Chinese Office Action for Chinese Application No. 201980060205.X, dated Jun. 14, 2023, 24 pages with translation.

* cited by examiner

METHOD FOR ESTIMATING A PORE PRESSURE VALUE IN GEOLOGICAL FORMATIONS TO BE DRILLED BY A DRILLING APPARATUS

TECHNICAL FIELD

The present disclosure relates to a method for estimating a pore pressure value in geological formations to be drilled by a drilling apparatus.

BACKGROUND

Methods are known in the state of the art for identifying, predicting and estimating anomalous pore pressure of a geological formation to be drilled by means of drilling apparatuses largely belonging to measurements taken from the surface that have a low spatial resolution.

Current methods estimate the pore pressure of the geological formation to be drilled in a poorly appreciable manner and in a manner that is difficult to detect, so much so that the bit of the drilling apparatus risks encountering dangers that may result in explosive situations, the so-called "blow out", or in breakdowns.

Other methods such as for example, the one of the Applicant already published as WO 2014/111846 A1, are based on acoustic measurements directly in the geological formation in front of a bit of the drilling apparatus, in jargon "look ahead".

Bits of the state of the known technique mount electro-acoustic transducers that are positioned directly in contact with a first geological formation to be drilled in order to transmit a signal in propagation through the first geological formation; such signal is reflected by a first discontinuous interface present between the first and the second geological formation to be drilled, where the second geological formation is subject to anomalous pore pressure, and finally the reflected signal is propagated back again through the first geological formation and received as signal received by the receiving electro-acoustic transducer.

The received signal is very weak with respect to a spurious signal contribution, due to electronics of the receiving electro-acoustic transducer.

The positioning of the electro-acoustic transducers in direct contact with the first geological formation is a difficult operation that slows down the excavation of the well.

Possible irregularities in the excavation geological formation may affect the operation of the electro-acoustic transducers or damage them.

The electro-acoustic transducers are to be mounted on actuators that move them in and out of the bit to bring them in contact with the formation.

Once the electro-acoustic transducer is brought in contact with the geological formation to be drilled, a pre-loading system is necessary to minimize the vertical movement of the body of the transmitter and therefore maximize the force exerted on the formation; such system also is to be such as to preferably keep the resonance frequency of the system outside the operating band.

SUMMARY

The present disclosure relates to a method that identifies an anomalous pore pressure which is capable of estimating a pore pressure of a geological formation to be drilled while overcoming the disadvantages of the known technique.

According to the disclosure, this object is achieved with a method according to claim 1.

Another object of this disclosure relates to making a system that implements the method according to claim 1 and that also operates in a layer of mud of an excavation well.

According to the disclosure, such other object is achieved with a system according to claim 14.

Other features are comprised in the dependent claims.

BRIEF DESCRIPTION OF THE DRAWINGS

The features and advantages of this disclosure will be more apparent from the following description, which is to be understood as exemplifying and not limiting, with reference to the appended schematic drawings, wherein.

DETAILED DESCRIPTION OF THE DRAWINGS

Figure 1:
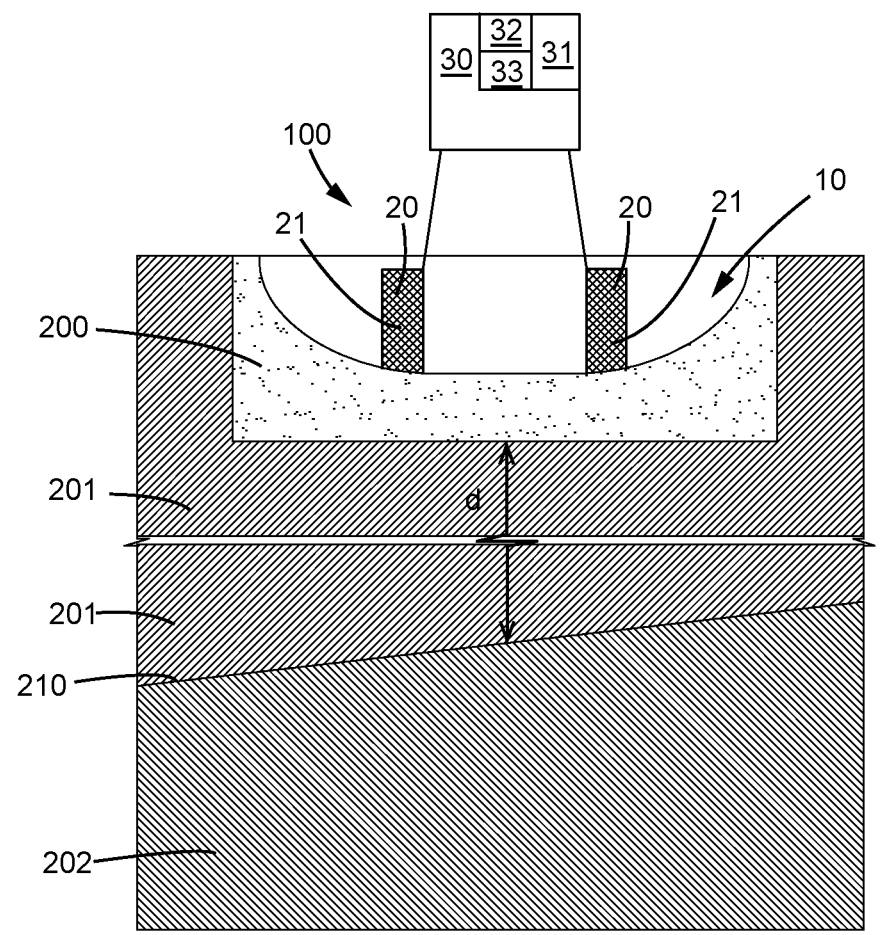
FIG. 1 is a view of an example diagram of a bit of a drilling apparatus that mounts two electro-acoustic transducers, a transmitting electro-acoustic transducer and a receiving electro-acoustic transducer of a system according to this disclosure; the bit is submerged in a layer of drilling mud during an excavation of a well to drill a first geological formation and a second geological formation subject to an anomalous pore pressure with respect to a hydrostatic pressure; there is a first discontinuous interface between the first and the second geological formation.

With reference to the drawings mentioned and in particular to FIG. 1, a system 100 is shown for identifying a first discontinuous interface 210 between a first geological formation 201 to be drilled and a second geological formation 202 to be drilled, where the second geological formation 202 to be drilled is subject to anomalous pore pressure. The first geological formation 201 and the second geological formation 202 are arranged in succession from one another at increasing depth.

The system 100 estimates a value of this anomalous pore pressure of the second geological formation 202 at depth level of the first discontinuous interface 210.

The drilling occurs by means of a drilling apparatus.

This system 100 comprises two electro-acoustic transducers 20 that are mounted on a bit 10 of the drilling apparatus, at least one memory 32 for containing data and at least one control processor 30 for processing data contained at least in the memory 32.

The two electro-acoustic transducers 20 comprise piezoelectric devices and/or movable magnet devices. A first electro-acoustic transducer 20 is a transmitter 21 and a second electro-acoustic transducer 20 is a receiver 22. The transmitting electro-acoustic transducer 21 comprises an actuator and the receiving electro-acoustic transducer 22 comprises a sensor.

The bit 10 of the drilling apparatus drills a well to extract hydrocarbons in fluid state or of mud, in a ground comprising a layer of drilling mud 200 and the geological formations still to be drilled and that are a first geological formation 201 and a second geological formation 202 ordered in succession as the depth in the ground to be excavated increases. The second geological formation 202 in FIG. 1 is subject to anomalous pore pressure. The anomalous pore pressure may be both an overpressure and an under pressure. The first discontinuous interface 210 is between the first geological formation 201 and the second geological formation 202. The anomalous pore pressure of the second geological formation 202 is measured at depth level of the first discontinuous interface 210.

As shown in FIG. 2, the bit 10 is of the PDC—Polycrystalline Diamond Composite—type.

The bit 10 comprises a face 15, a multiplicity of nozzles 13 made in the face 15 for the passage of mud, a multiplicity of ridges 11 that protrude from the face 15, a multiplicity of diamond-edged blades 12 each mounted with a respective portion of the ridge 11 facing an excavating rotation direction of the bit 10.

Figure 2A:
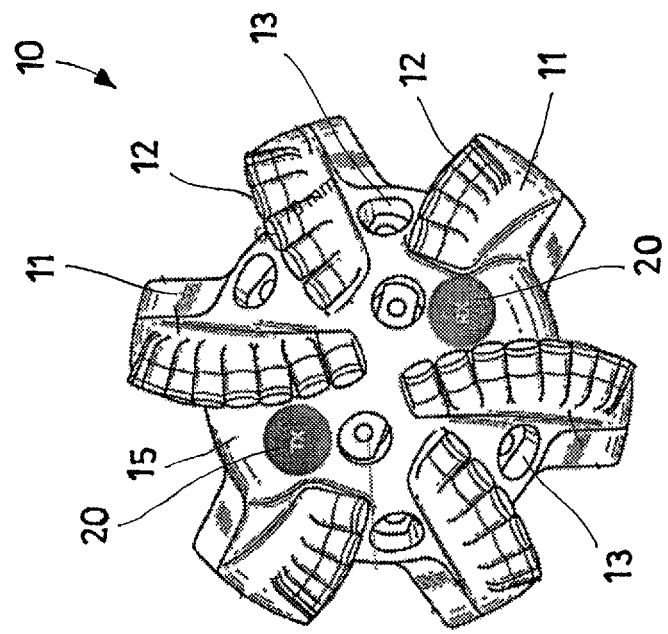
FIG. 2A is a view from below of the bit which shows a face of the bit; the bit has ridges, on which diamond-edged blades are mounted; the two electro-acoustic transducers are mounted on different ridges.

Two ridges 11 of the multiplicity of ridges 11 of the bit 10 each mount an electro-acoustic transducer 20 on a portion of the ridge 11 facing in opposite direction with respect to the excavating rotation direction of the bit 10, as shown in FIG. 2A.

The position of the electro-acoustic transducers 20 imposes a constraint on the sizes thereof, in particular a radiant surface of the transmitting electro-acoustic transducer 20 and a receiving surface of the receiving electro-acoustic transducer 20 are constrained to have a diameter that is not greater than 30 mm.

The distance between the two electro-acoustic transducers 20 is not greater than 10 cm, considering sizes of a standard bit 10. The distance between the transmitting and receiving electro-acoustic transducers 20 depend on the sizes of the bit 10, and in general better results are obtained by maximizing the distance between the two electro-acoustic transducers 20.

The two electro-acoustic transducers 20 comprise a transmitting and receiving face facing the excavation portion to be drilled.

The position of the two electro-acoustic transducers 20 on the ridges 11 advantageously takes advantage of the space between the ridges 11, thus avoiding a central part of the face 15 where there are the nozzles 13 for the passage of the drilling mud.

This position of the two electro-acoustic transducers 20 on the ridges 11 of the bit 10 is particularly favourable and advantageous for operating the system 100 also in the layer of drilling mud 200. When the system 100 functions with the two electro-acoustic transducers 20 arranged in the layer of drilling mud 200, it is said that the system 100 is coupled with the layer of mud 200, i.e. in the so-called "fluid coupled" configuration of the system 100.

Indeed, the system 100 advantageously is able to identify and measure the anomalous pore pressure also if the electro-acoustic transducers 20 are in the layer of mud 200.

The system 100 also functions when the electro-acoustic transducers 20 are in contact with the first geological formation 100.

The electro-acoustic transducers 20 may be both in direct contact with the geological formation 201, in a so-called "formation coupled" configuration of the system 100, or they may be in direct contact with the layer of mud 200 and be coupled by means of the layer of drilling mud 200 in a so-called "fluid coupled" configuration of the system 100.

The electro-acoustic transducers 20 may have the same type of coupling, that is both "fluid coupled" or both "formation coupled", or different types of coupling, for example the transmitting electro-acoustic transducer 20 in "formation coupled" configuration and the receiving electro-acoustic transducer 20 in "fluid coupled" configuration, or vice versa.

The so-called "crosstalk" effect advantageously is minimized in the "formation coupled" configuration of the electro-acoustic transducer 20.

An independence of irregularities in the geological formation 201 and of rock fragments that break loose from the excavation during the drilling, that is the so-called "cuttings", advantageously is obtained in the "fluid coupled" configuration of the electro-acoustic transducer 20.

Moreover, the electro-acoustic transducers 20 advantageously are not to be moved outside the bit 10 but may remain within the envelope of the bit 10.

The solution with the electro-acoustic transducers 20 in "fluid coupled" configuration is even more efficient when the electro-acoustic transducers 20 are housed on the ridges 11 of the bit 10 because the electro-acoustic transducers 20 are a few centimetres closer to the geological formation 201 and therefore the energy transmitted in the geological formation 201 is increased.

With regard to the receiving electro-acoustic transducer 20, it is important to minimize the signal component due to the coupling between the two transmitting and receiving electro-acoustic transducers 20 through the metal of the drilling bit 10. For example, if the receiving electro-acoustic transducer 20 is of the piezoelectric type, it is possible to use the so-called "acceleration balanced" type configuration, known to experts in the field.

The system 100 is also capable of discerning when an anomaly of the received observable data is due to the anomalous pore pressure and in this case, estimates the value thereof. Indeed, the first discontinuous interface may be due to a lithological change of types of rock and/or to the anomalous pore pressure, that is to a pore pressure that is different from the hydrostatic value.

The change of physical-mechanical parameters between the first 201 and the second 202 geological formations at the first discontinuous interface 210 may be both a sudden variation and a gradual variation.

To detect the presence of the discontinuous interface 210 between the two geological formations to be excavated, the transmitting electro-acoustic transducer 20 generates and transmits a transmitted signal which is a first acoustic or elastic wave that has such an amplitude and frequency that they are adapted to detect a possible presence of any discontinuous interface in the geological formation 200, 201, 202 to be excavated.

The transmitted signal may be an impulse with fundamental frequency centred in the operating band, for example 3 sinusoid cycles, or a continuous sinusoid, at least 100 cycles, modulated in frequency, for example from a linear ramp, a linear "chirp".

The signal transmitted by the transmitting electro-acoustic transducer 20 comprises a frequency field that ranges from 50 Hz to 5000 Hz. This frequency band allows reaching a depth of penetration in the geological formations 200, 201, 202 to be excavated in the order of 10 m, advantageously with a much greater resolution than the one obtainable with seismology methods.

The signal transmitted by the transmitting electro-acoustic transducer 20 is continuous.

The transmitted signal is propagated as propagated signal through the first geological formation 201 up to reaching the first discontinuous face 210, where the propagated signal is partly reflected back as reflected signal. The signal reflected by the first discontinuous interface 210 represents a percentage between 10 and 20 percent of the intensity of the signal propagated up to the first discontinuous interface 210. The reflected signal is propagated back through the first geological formation 201 as propagated reflected signal up to reaching the electro-acoustic transducers 20 as received signal.

The receiving electro-acoustic transducer 20 receives the received signal which is transformed into an electric and/or digital received signal that comprises observable data that are sent to the memory 32, where these observable data are then processed by the processor 30 of the system 100.

The received signal that the receiving electro-acoustic transducer 20 receives first is a compressional stress wave that is the fastest, and therefore is the first to reach the receiving electro-acoustic transducer 20.

It is necessary to know a compressional speed in the geological formation 201 in drilling phase in order to estimate the outbound and inbound time of the signals. A value of the compressional speed may already be known from other surface seismology measuring processes and possibly may be confirmed and refined by the so-called "sonic logs" by means of conventional measuring tools during the excavation of the well, the so-called "logging while drilling" (LWD) tools. If this value is not available, it is possible to estimate the compressional speed in the geological formation 201 by repeating the measurement described above after drilling at least a distance equal to a resolution of the measurement.

The measurement resolution "res" depends inversely on a band B of the transmitted signal and directly on the propagation speed of the compressional wave in the formation 201 $c_{P201}$:

$$res = \frac{c_{P201}}{2B}$$

$$res = \frac{c_{P201}}{2B}$$

given that B is in the order of several thousand Hz and $c_{P201}$ and $c_{P1}$ in the order comprised between 3 and 6 km/s, the best resolution "res" is in the order of one metre.

Based on the observable data of the signal received from the receiving electro-acoustic transducer 20, the electronic processor 30 processes the data and estimates the distance from the first discontinuous interface 210 that the bit 10 hits during the drilling, performing a first operation in which the processor 30 calculates the outbound and inbound time between the transmitted signal and the received signal in analogue manner by identifying a cross-referenced correlation peak, or "cross" correlation between the transmitted signal and the received signal, or by identifying a beat frequency of a multiplication between the transmitted signal and the received signal.

Advantageously, the transmitted signal is a sinusoid modulated in frequency so that a processing by the processor 30 requiring a multiplication between the transmitted signal, that is a drive signal, and the received signal, a selection of the signal obtained from the multiplication by means of a low-pass filtering algorithm implemented by the processor 30 to remove sum frequencies, finally the processor 30 implements an AC coupling to reduce the possible "crosstalk" component, may be implemented in analogue manner.

Should "crosstalk" occur and the receiving electro-acoustic transducer 20 be deaf, then there is no impairment of the resolution of the useful signal prior to the acquisition because the sampling is performed after the analogue conditioning of the signal.

Depth of the first discontinuous interface 210 being equal, the signal-disturbance ratio at the receiving electro-acoustic transducer 20 is greater because the band of the received useful signal is less and accordingly, the noise power is less.

Energy transmitted being equal, the power in transmission is less and therefore the drive voltage required is less.

It is possible from experiments in progress to detect the first discontinuous interface 210 if such discontinuity 210 is at a distance from the bit 10 where the electro-acoustic transducers 20 are mounted comprised between 0 and 15 metres.

Fine-turning of the system 100 may however succeed in obtaining detections of the first discontinuous interface 210 also at greater distances from the bit 10, although detections at greater distances than 15 metres may be affected by the type of geological formations 200, 201, 202 to be drilled by the drilling apparatus.

The presence of the possible pore pressure anomaly in the formation to be drilled induces a measurable effect in the electric impedance spectrum Z(f) of the transmitting electro-acoustic transducer 20 and measurable in the spectrum H(f) of the signal received from the receiving electro-acoustic transducer 20.

If the preceding phase detected the first discontinuous interface because the receiving electro-acoustic transducer 20 received the signal received from the reflection on the first discontinuous interface 210, then the processor 30 controls the transmitting electro-acoustic transducer 21 to generate and transmit a second transmitted signal, which is a second acoustic/elastic wave that is adapted to discriminate whether the anomaly detected in the preceding phase was due to a lithological change or to an anomalous pore pressure. The possible presence of the first discontinuous interface 210 results in a particular attenuating and/or dispersive effect of the received signal that is recorded in the memory 32 of the system 100.

The particular attenuating and/or dispersive effect of the received signal comprises a particular effect in frequency with respect to the receiving frequency of the receiving electro-acoustic transducer 20, and a particular effect in impedance with respect to the impedance of the transmitting electro-acoustic transducer 20.

This particular attenuating and/or dispersive effect is mapped by the processor 30 and recorded in the memory 32, for example, by mapping this particular effect in the following transfer functions: electric impedance Z(f) of the transmitter or response in frequency H(f) of a system comprising the two transmitting and receiving electro-acoustic transducers 20 and the geological formation 201. The particular attenuating and/or dispersive effect is loaded beforehand in the memory 32 because it is already known from previous tests or previous measurements, so that it may be compared with the one measured in the field and analysed by the processor 30.

The transmitted signal may be a set of discrete tones lasting at least 100 cycles to reach the stationary status, the frequencies of which cover the operating band with sufficiently small step F, for example 10 Hz. For each frequency $f_n = nF$, the transfer functions are calculated as follows $$Z(nF) = \frac{V(nF)}{I(nF)}$$

$$H(nF) = \frac{R(nF)}{V(nF)}$$

where v, i and r are respectively the drive voltage of the receiving electro-acoustic transducer 30, the drive current of the transmitting electro-acoustic transducer 20 and the signal received from the receiving electro-acoustic transducer 20. The capital letters V, I, R indicate the respective Fourier transforms.

The transmitted signal may be Gaussian white noise lasting a few seconds, which is conveniently filtered in the operating band by means of band-pass filtering. The transfer functions are calculated as follows:

$$Z(f) = \frac{\wp_{vi}(f)}{\wp_{ii}(f)}$$

$$H(f) = \frac{\wp_{rv}(f)}{\wp_{vv}(f)}$$

where $\wp_{xx}(f)$ and $\wp_{yx}(f)$ are the estimates by means of Welch periodogram, respectively, of the density of spectral power of a generic signal x and of the density of combined spectral power of a generic signal y with the generic signal x.

The electro-acoustic transducers 20 transmit the signal that is propagated in the mud 200 also through the mud 200, the signal transmitted and propagated in the mud is further propagated through the first geological formation 201 up to reaching the first discontinuous face 210, where the signal is partly reflected back. The signal reflected by the first discontinuous interface 210 is propagated back through the first geological formation 201 and finally is further propagated through the mud 200 up to reaching the electro-acoustic transducers 20. At least one of the electro-acoustic transducers 20 receives the signal which is transformed into an electric signal that contains observable data that are sent to the memory 32; these observable data are then processed by the processor 30 of the system 100.

Even more advantageously, the processor 30 also estimates the value of the anomalous pore pressure.

To estimate the value of the pore pressure from the observable data received, the processor 30 applies an algorithmic model based on observable in a frequency domain, otherwise called "frequency-domain" model.

The estimate of the pore pressure may be carried out starting from the transfer functions Z(f), H(f).

The resonance frequency of the electro-acoustic transducers 20 preferably is less than a minimum operating frequency or greater than a maximum operating frequency.

Figure 3:
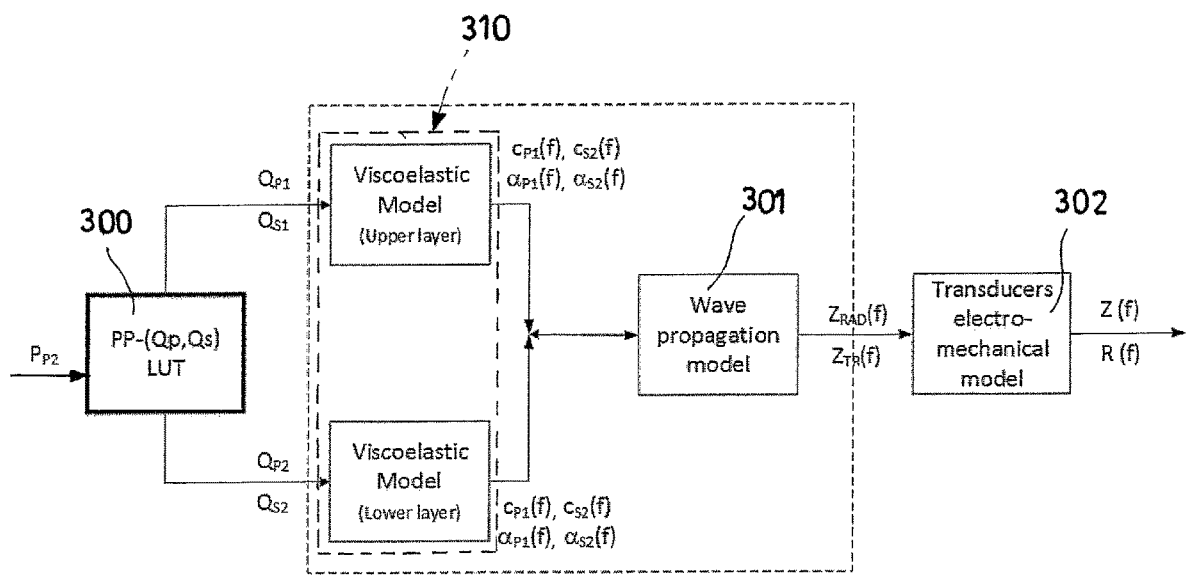
FIG. 3 is a flow chart diagram showing logical blocks of a process for estimating the pore pressure.

According to one approach based on an algorithmic calculation model, the so-called "model-based" model, the processor 30 defines three modes 300, 310, 301, 302 that are logically connected to one another, as shown for example in FIG. 3.

The first pore pressure model 300 of the second geological formation 202. The processor 30 receives the pore pressure in the second geological formation 202 as input and provides inelastic parameters of the second geological formation 202 as output, for example compressional and cutting quality factors $Q_P$ and $Q_S$. Auxiliary parameters that comprise elastic parameters of the geological formation 202, for example density $\rho$, compressional and cutting propagation speed $c_P$, $c_S$, are also required, for which generally an estimate 310 provided by the surface seismology is available. The model 300 includes a "Look-Up Table" (LUT) that may be made by taking the above-described measurements (discrete tones or Gaussian noise) under laboratory conditions, as per the block diagram shown in FIG. 5.

Figure 4:
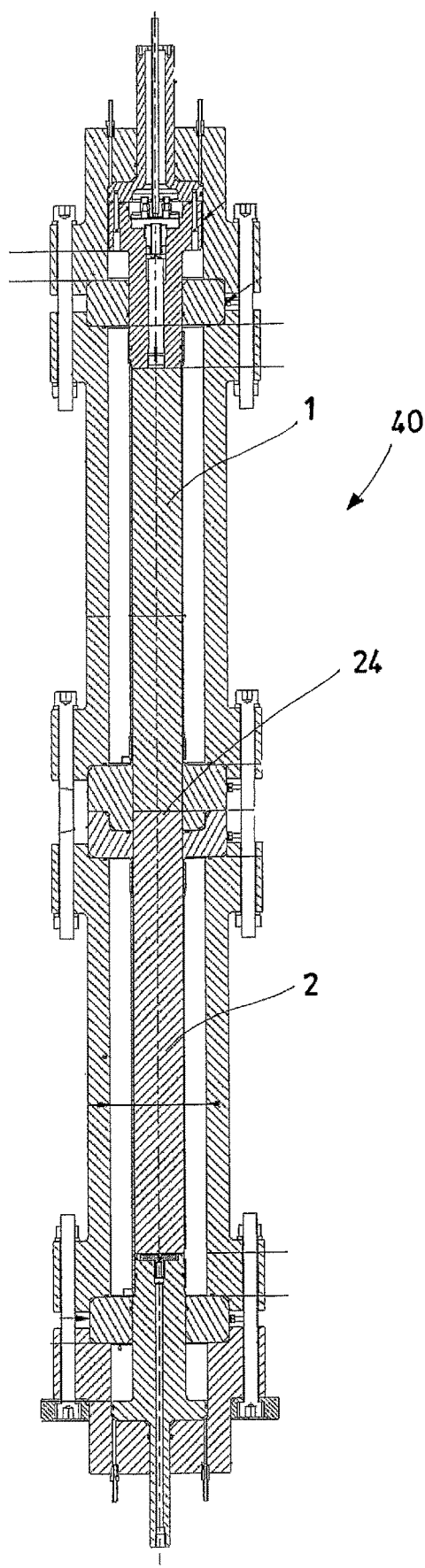
FIG. 4 is a sectional view of a test triaxial cell comprising a first test formation and a second test formation, among which there is a first discontinuous test interface.

An example of laboratory measurement set-up is a triaxial cell 40, as shown in FIG. 4, containing two samples of rock formation 1 and formation 2 having metric sizes, arranged one above the other. Such cell 40 is to vertically compress the samples with a given stress to simulate the weight of the overlying sediments, radially compress the samples with a containment pressure, for example in oil, to simulate the horizontal stress exerted by the side sediments and to create different types of tensional states, for example oedometer, compressive tectonic, etc. which are known to the experts in the field. The cell 40 is also to inject a fluid, which may be oil or water or gas, into the sample formations 1, 2 at the desired pressure, that is at the pore pressure. The two transducers 20 are to be coupled to the first sample 1 according to the methods indicated above in a chamber containing a liquid at the desired pressure, which simulates the weight of the mud column 200. The energy transmitted by the cell 40 is to be regulated as a function of the depth d of the first discontinuous test interface 24 to generate a response that is equivalent to the one of a formation placed at a distance d from the electro-acoustic transducers 20 on the bit 10 so as to avoid the energy reflected from the bottom of the cell 40 from coming back to the transducers, thus generating an artefact. By using a sufficiently variegated set of pairs of formations 1, 2 in terms of lithology, porosity, permeability, etc., and varying the pore pressure for each combination, it is possible to obtain a correspondence in table form between pore pressure and compressional/cutting quality factors ($Q_P$, $Q_S$) parameterized in the type of formation 202, as shown in FIG. 5.

Figure 5:
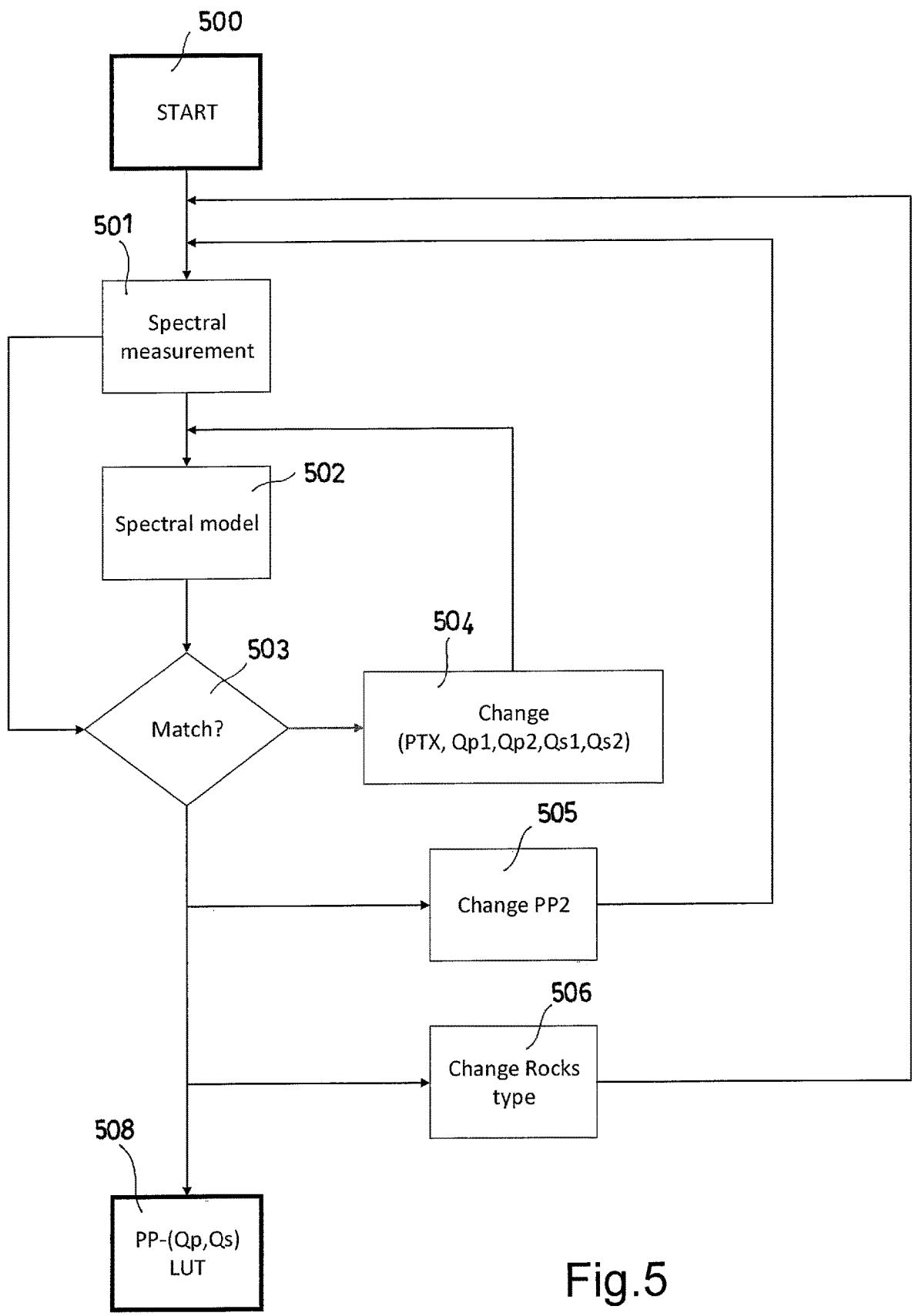
FIG. 5 is a flow chart diagram showing logical blocks of a process for making a "training set", that is a database through a training process of a system by means of the test triaxial cell.

The diagram in FIG. 5 shows a start 500 of the building process of the "look-up table" comprising a spectral measurement 501, a comparison with the synthetic spectra generated by a known spectral model 502 starting from the pore pressure applied and by an initial value for the compressional/cutting quality factors $Q_P$, $Q_S$; if 503 the spectral measurements 501 are compared within a given threshold with the known spectral model 502, then the correspondence is determined 508 between the compressional/cutting quality factors $Q_P$, $Q_S$ and pore pressure $P_P$; otherwise compressional parameters of the signal transmitted by the transmitting electro-acoustic transducer 20 PTX are to be changed 504 by modifying the parameters of the first 1 and the second test formation 2 $Q_{P1}$, $Q_{P2}$, $Q_{S1}$, $Q_{S2}$. Then the process is repeated by changing 505 the value of the pore pressure model of the formation 2 of test PP2. Finally, the process is further repeated by changing 506 the type of rock in the cell 40.

The second acoustic propagation model 301 is a "frequency domain" model that describes the propagation in a stratified formation by considering waves P, SV, SH and the various modal conversions at the solid-solid and solid-fluid interfaces while considering the inelastic or visco-elastic aspects by means of a convenient constitutive model of the formation, where certain examples are the Zener model or the Kjartansson model, which are known to the experts in the field. The processor 30 processes observable input data which are inelastic parameters of the formation 2, for example the compressional and cutting quality factors, Qp and Qs, that were calculated by the model 300 discussed above or by known knowledge 310 for surface seismology measurements. The processor 30 calculates the radiation impedance of the transmitting electro-acoustic transducer 20 and the transimpedance of the transmitting-receiving electro-acoustic transducers as shown in the transfer functions for the "formation coupled" and "fluid coupled" configuration of the electro-acoustic transducers 20:

$$Z_{RAD}(f) = \frac{F_{TX}(f)}{v_{TX}(f)}$$

$$Z_{TR}(f) = \begin{cases} \frac{F_{TX}(f)}{v_{RX}(f)}, & \text{formation coupled} \\ \frac{F_{RX}(f)}{v_{TX}(f)}, & \text{fluid coupled} \end{cases}$$

where $F_{TX}$ is the force exerted by the transmitting electro-acoustic transducer 20 on the formation or on the mud and $v_{TX}$ is the driven vertical component of deformation speed of the formation or of the mud; $F_{RX}$ is the force exerted, on the surface of the receiving electro-acoustic transducer 20, by the refracted wave pressure in the layer of mud 200 generated by the reflection at the interface 24, 210 between the two formations 1, 201, 2, 202; $v_{RX}$ is the vertical deformation speed component of the formation 200, 201 immediately adjacent to the surface of the receiving electro-acoustic transducer 20 induced by the wave of stress generated by the reflection at the interface 24, 210 between the two formations 1, 201, 2, 202.

Other auxiliary parameters considered by the processor 30 comprise elastic parameters of the formation 2 and possible "dip" of the interface 24, 210 between the two formations 1, 201, 2, 202, of which an estimate provided by the surface seismology 310 generally is available; elastic parameters of the formation 1, 201 and of the drilling mud 200, of which an estimate provided by the surface seismology 310 generally is available, in any case that can be fine-tuned by means of the "sonic logs" of the LWD tools; inelastic parameters of the formation 1, 201, which can be extrapolated from the "sonic logs" of the LWD tools.

In the preferred embodiment, a circular section acoustic source is assumed, therefore the problem may be dealt with in cylindrical coordinates (r,φ,z). In such preferred embodiment, it is also assumed that the source moves in the vertical direction z alone and therefore the source only excites the waves P and waves S with vertical polarization (SV), which implies that the stress and speed fields do not depend on the azimuth coordinate φ.

The complex wave numbers k indicating the intensity of the wave vectors of a generic means m are defined as $$k_{Pm}(\omega) = \frac{\omega}{\hat{c}_{Pm}(\omega)} - j\alpha_{Pm}(\omega)$$

$$k_{Sm}(\omega) = \frac{\omega}{\hat{c}_{Sm}(\omega)} - j\alpha_{Sm}(\omega)$$

where $\hat{c}_P(\omega)$, $\hat{c}_S(\omega)$ and $\alpha_P(\omega)$, $\alpha_S(\omega)$ are calculated by means of a convenient constitutive model of the formation: the preferred model is the Kjartansson model, which requires the knowledge of: $c_P$, $c_S$, of which availability is assumed of an estimate by means of "sonic log" 310 for the formation 1 and from surface seismology 310 for the formation 2; $Q_P$, $Q_S$, of which availability is assumed of an estimate by means of "sonic log" 310 for the formation 1, 201 and from the above-described pore pressure model 300 for the formation 2, 202. The longitudinal propagation constants (longitudinal components of the wave vectors k) of a generic means m are defined as:

$$k_{zPm} = \sqrt{k_{Pm}^2 - \sigma^2}$$

$$k_{zSm} = \sqrt{k_{Sm}^2 - \sigma^2},$$

where σ is the spectral variable (radial component of the wave vector k).

The dependency on the frequency ω is omitted for all the quantities indicated. The only variables that do not have this dependency are the densities ρ of the means and the geometrical parameters: a radius of the cross section of the transducers; $L_F$ thickness layer of mud and thickness L of the formation 1, 201.

For the configuration of "formation coupled" electro-acoustic transducers 20, the radiation impedance $Z_{RAD}$ may be calculated as the parallel of impedances:

$$Z_{RAD} = \frac{Z_{RAD}^{(HS)} Z_{TR}}{Z_{RAD}^{(HS)} + Z_{TR}}$$

where $Z_{RAD}^{(HS)}$ is the radiation impedance relative to a "half-space" of formation 1, 201, that is to an indefinitely extended space without discontinuous interfaces and therefore without reflections:

$$Z_{RAD}^{(HS)} = -\frac{\pi a \; \mu_1}{2\omega \int_0^\infty k_{S1}^2 \frac{k_{zP1}}{F(\sigma)} \frac{J_1^2(\sigma a)}{\sigma a}}$$

$$\mu_1 = f(\rho_1, c_{S1}, \alpha_{S1})$$

$$F(\sigma) = (2\sigma^2 - k_{S1}^2)^2 + 4k_{zP1}k_{zS1}\sigma^2$$

and $Z_{TR}$ is the transimpedance TX-RX $$Z_{TR} = \frac{\pi a^2 \mu_1}{4Le^{-jk_{P1}2L} j\omega} \int_0^\infty \psi(S_{11}, e^{-jk_{zS1}L}, e^{-jk_{zP1}L}) \frac{k_{zP1}^2}{F(\sigma)} \frac{J_1^2(\sigma a)}{\sigma a} d\alpha$$

where ψ( ) is a function and $S_{11}$ is the first 2×2 sub-matrix of the 4×4 scattering matrix:

$$S^{(1,2)} = \begin{bmatrix} S_{11} & S_{12} \\ S_{21} & S_{22} \end{bmatrix}$$

relative to the interface 24, 210 (formation 1, 201, formation 2, 202); such matrix is defined as the transformation matrix between the (complex) wave amplitude vectors $$\begin{bmatrix} A_1^{SV-} \\ A_1^{P-} \\ A_2^{SV+} \\ A_2^{P+} \end{bmatrix} = S^{(1,2)} \begin{bmatrix} A_1^{SV+} \\ A_1^{P+} \\ A_2^{SV-} \\ A_2^{P-} \end{bmatrix}$$

and is a function of the modal matrixes of the formations 1 and 2

$$S^{(1,2)} = F_{1,2}(M_1, M_2)$$

the modal matrix of a means "i" is the matrix comprising the eigen vectors of the system of differential equations that describes the propagation of the wave in the indefinitely extended means "i"; it generally is a 4×4 matrix and is a function $$M_i = G_i(\sigma, \rho_i, c_{Pi}, c_{Si}, \alpha_{Pi}, \alpha_{Si}).$$

As mentioned above, it is assumed that the source moves in the vertical direction z alone and therefore that it only excites the waves P and waves S with the vertical polarization SV. Therefore, the modal matrixes of the two formations and the scattering matrix of the interface generally are 4×4.

If the source were generic, the horizontal polarization waves S (the "stress" and speed fields would also depend on the azimuth coordinate) also would be considered, and therefore such matrixes would become 6×6.

For the configuration of "fluid coupled" electro-acoustic transducers 20, the radiation impedance may be calculated as the series of impedances $$Z_{RAD} = Z_{RAD}^{(HS)} + Z_{TR}$$

where $Z_{RAD}^{(HS)}$ is the radiation impedance relative to a "half-space" of mud, which can be calculated in closed form $$Z_{RAD}^{(HS)} = \pi a^2 \rho_F c_F \left[ \left(1 - \frac{2J_1(2k_F a)}{2k_F a}\right) + j\frac{2H_1(2k_F a)}{2k_F a} \right]$$

and $Z_{TR}$ is the transimpedance TX-RX $$Z_{TR} = 2\pi a^2 j\omega\rho_F e^{j2k_F 2L_F} \int_0^\infty \varphi(s_{11}) \frac{J_1^2(\sigma a)}{\sigma a} d\sigma$$

where $$\varphi(s_{11}) = \frac{2s_{11}}{1 - s_{11} e^{j2k_{zF}L_F}}$$

and $s_{11}$ is the first element of the 3×3 scattering matrix $$S = \begin{bmatrix} s_{11} & s_{12}^T \\ s_{21} & s_{22} \end{bmatrix}$$

relative to the chain of interfaces (mud, formation 1) and (formation 1, formation 2); such matrix is defined as the transformation matrix between the (complex) wave amplitude vectors $$\begin{bmatrix} A_F^{P-} \\ A_2^{SV+} \\ A_2^{P+} \end{bmatrix} = S \begin{bmatrix} A_F^{P+} \\ A_2^{SV-} \\ A_2^{P-} \end{bmatrix}$$

S is calculated as $$S = \overline{S}^{(F,1)} * S^{(1,2)}$$

where * indicates the Redheffer product between matrixes and $$\overline{S}^{(F,1)} = f(S^{(F,1)}, e^{-jk_{zS1}L}, e^{-jk_{zP1}L})$$

and $S^{(F,1)}$ is the scattering matrix relative to the interface (mud 200, formation 1, 201) and $S^{(1,2)}$ is the scattering matrix relative to the interface 24, 210 (formation 1, 201, formation 2, 202).

In general, the generic interface (i,j) is a function $$S^{(i,j)} = F(M_i, M_j)$$

of the modal matrixes of the means i and j; the modal matrix of a means j is the matrix comprising the eigen vectors of the system of differential equations that describes the propagation of the wave in the indefinitely extended means i. The modal matrix of the mud is 2×2

$$M_F = \begin{bmatrix} 1 & -1 \\ \frac{\omega \rho_F}{k_{zF}} & \frac{\omega \rho_F}{k_{zF}} \end{bmatrix}$$

while the one of the formation "i" is in general a 4×4 matrix and is a function $$M_i = G(\sigma, \rho_i, c_{Pi}, c_{Si}, \alpha_{Pi}, \alpha_{Si})$$

As above, it is assumed that the source moves in the vertical direction z alone and therefore that it only excites the waves P and waves S with vertical polarization (SV). Therefore, the modal matrixes of the two formations and the scattering matrix of the interface generally are 4×4. The modal matrix of the mud is 2×2 and the scattering matrix of the mud/formation 1 interface is 3×3. If the source were generic, the horizontal polarization waves S (the "stress" and speed fields would also depend on the azimuth coordinate) also would be considered, and therefore the modal matrixes of the two formations and the scattering matrix of the interface would become 6×6, while the scattering matrix of the mud/formation 1 interface would become 4×4.

The third model 302 is an electromechanical model of the electro-acoustic transducers 20 and is a "frequency domain" model that describes the conversion between electrical and mechanical quantities in the transducers. The processor 30 receives a radiation impedance $Z_{RAD}$ in input, transimpedance $Z_{TR}$ and provides an electric impedance Z and response in frequency H in output. Auxiliary parameters comprising mechanical and electrical parameters of the transducers 20, electric impedance Z and the response in frequency H are required.

The electric impedance Z is calculated as $$Z = \frac{u_T}{i_T} = f_{TX}(Z_{RAD}; P_{TX})$$

where $u_T$ and $i_T$ are the voltage and the drive current of the receiving TX transducer 20 and $P_{Tx}$ is the set of electrical and mechanical parameters of the transmitting TX transducer 20.

For transducers 20 in "formation coupled" configuration, the response in frequency H is calculated as $$H = \frac{u_R}{u_T} = \frac{f_{RX}\left(\frac{F_T}{Z_{TR}}; P_{RX}\right)}{u_T}$$

$$F_T = g_{TX}(u_T, Z_{RAD}; P_{TX})$$

where $u_R$ is the signal at the ends of the transducer RX and $P_{RX}$ is the set of electrical and mechanical parameters of the receiving transducer RX.

For transducers 20 in fluid coupled configuration, the response in frequency H is calculated as $$H = \frac{u_R}{u_T} = \frac{f_{RX}(Z_{TR}v_T; P_{RX})}{u_T}$$

$$v_T = g_{TX}(u_T, Z_{RAD}; P_{TX})$$

where $u_R$ is the signal at the ends of the transducer RX and $P_{RX}$ is the set of electrical and mechanical parameters of the transducer RX.

Figure 7:
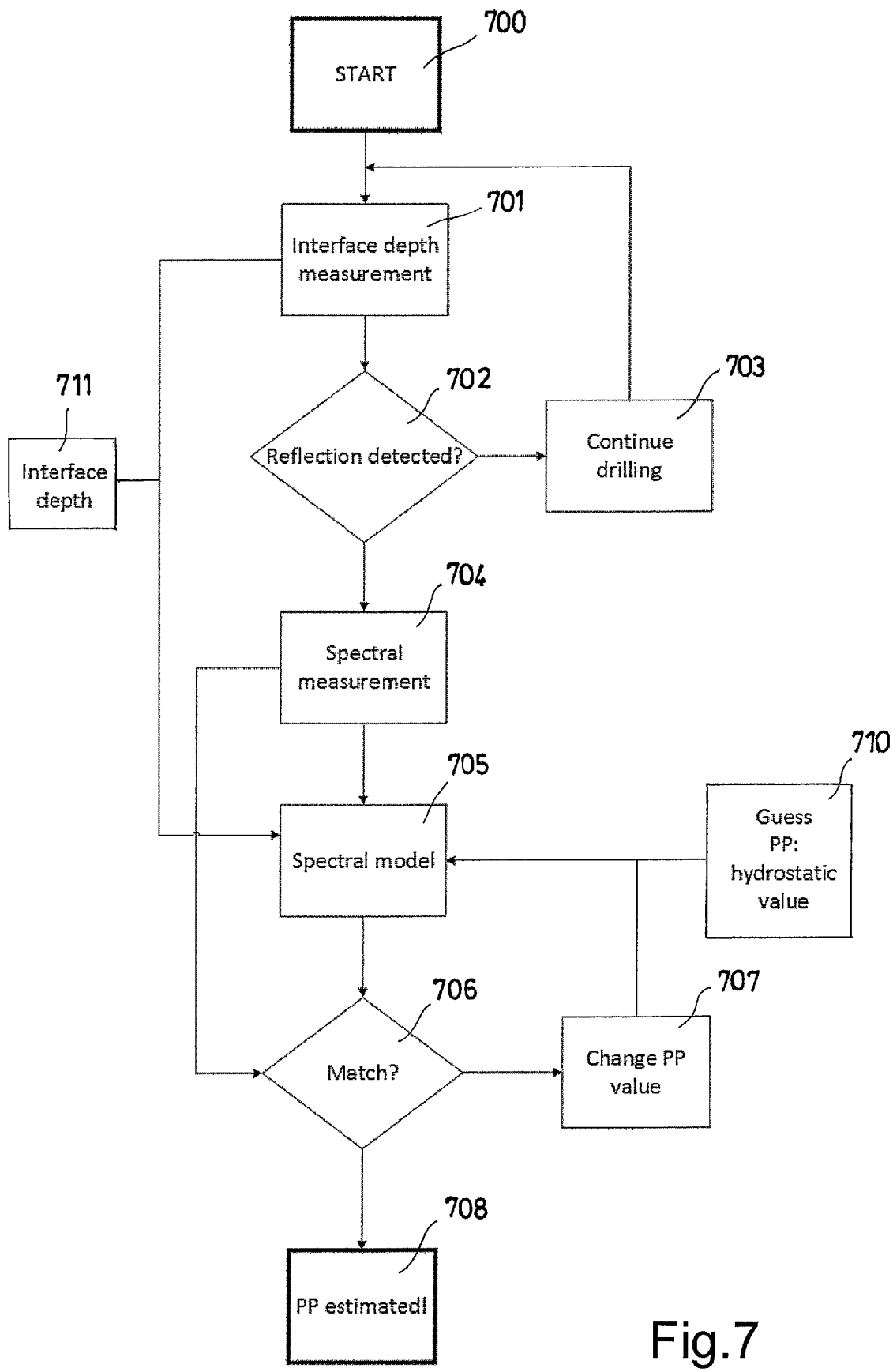
FIG. 7 shows a flow chart diagram showing logical blocks of a process based on an algorithmic model—that we will call "model based"—for estimating the pore pressure of the first discontinuous interface.

FIG. 7 shows an algorithm proposed for estimating the pore pressure according to the "model-based" approach.

Starting 700, the distance 711 of the first discontinuous interface 24, 210 is measured 701. If the reflection of the first discontinuous interface is identified 702, then spectral measurements continue to be taken 704, otherwise drilling is performed 703. The processor 30 iteratively calculates the synthetic spectra generated 705 by a pre-loaded spectral model starting from a pore pressure value. With each iteration, such value is modified 707 starting from an initial value or guess value, for example a hydrostatic value, and the synthetic spectra are recalculated until they can be compared 706 within a given threshold with the spectral measurements 704, therefore obtaining 708 the estimate of the pore pressure.

Figure 8:
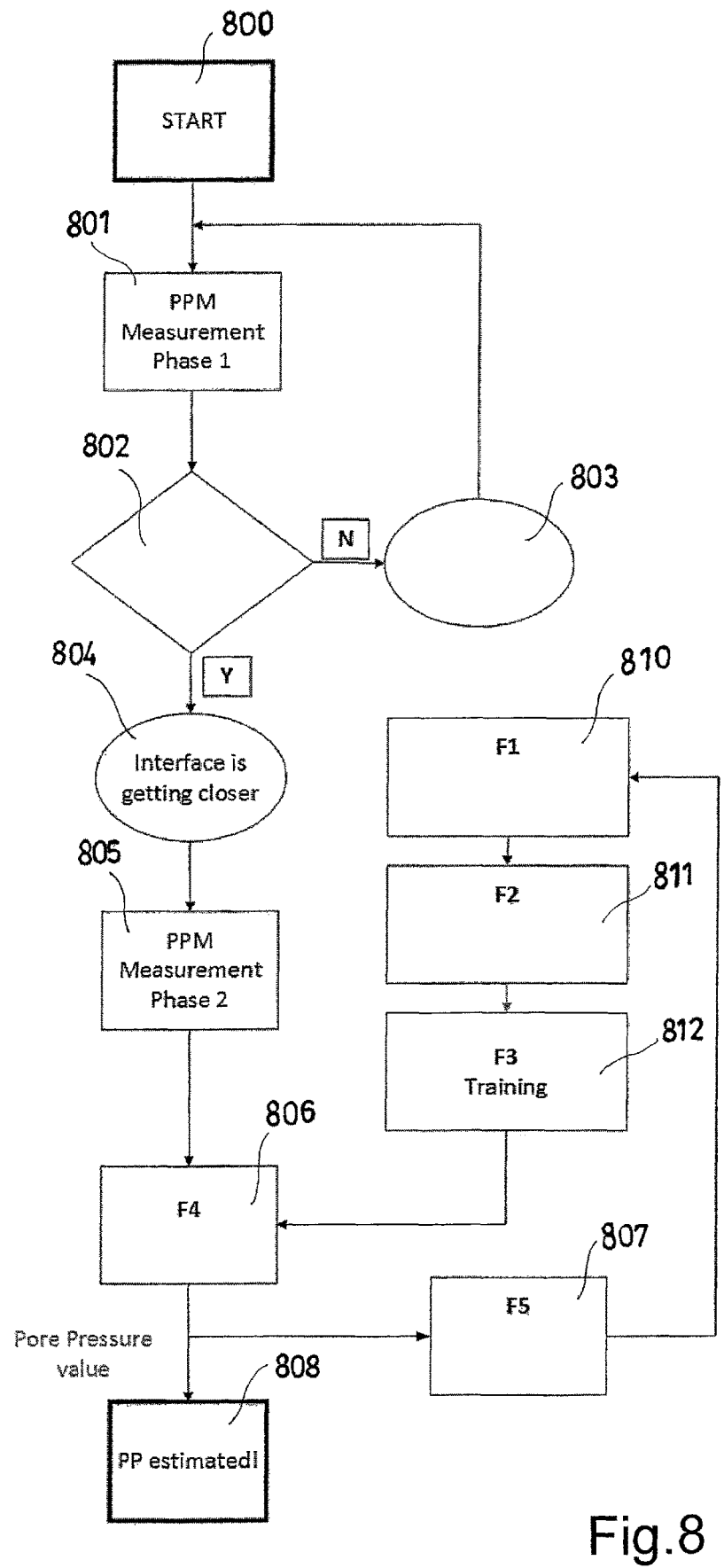
FIG. 8 shows a flow chart diagram showing logical blocks of a "pattern" recognition process, that is a recognition for images of graphic arrangements of observable data—that we will call "pattern recognition"—for estimating the pore pressure of the second geological formation to be drilled at the first discontinuous interface.

Together with or alternatively to the application of this so-called "model based" algorithmic model, the processor 30 comprises at least one module which is a classifier processor 31 and is capable of implementing another pattern recognition process, which flow chart is schematically illustrated in FIG. 8.

The classifier processor 31 is a "supervised" classifier.

The classifier processor 31 implements the "pattern recognition" process by statistically estimating the value of the pore pressure of the first discontinuous interface 210 by comparing, by means of a statistical algorithm, the observable data received from the system 100 and observable data already measured prior to the excavation of the well and that were previously loaded in a database 33 of the memory 32 of the system 100 which is accessible to the classifier processor 31.

Figure 6A:
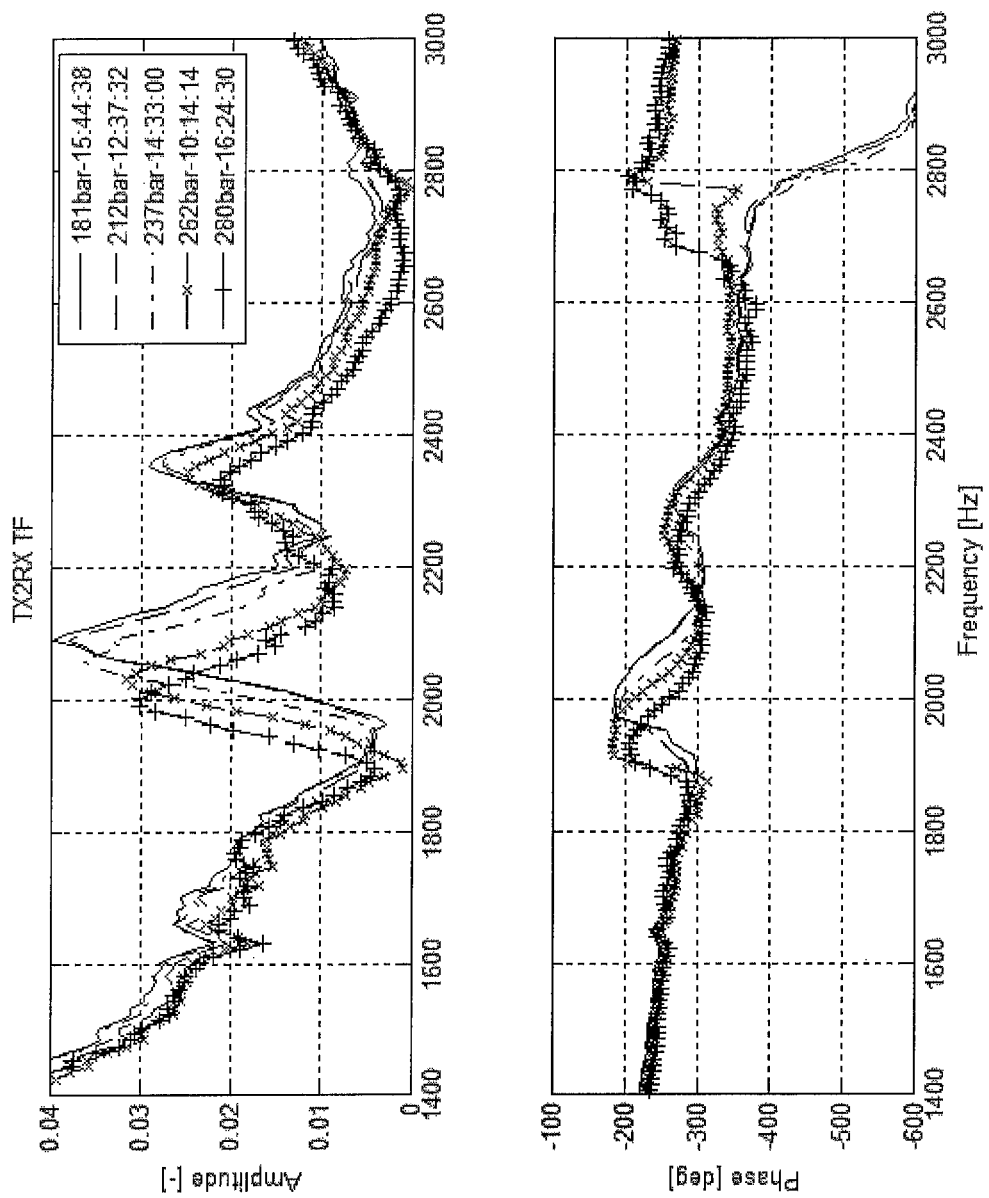
FIG. 6A shows two graphs of five overlapping response in frequency spectra of the receiving electro-acoustic transducer that are relative to a first test configuration between a first test formation and a second test formation which are known samples arranged in the test triaxial cell; the graphs are both as a function of a frequency range comprised between 1400 and 3200 Hz; the top graph shows an amplitude and the bottom graph shows a phase of a signal received from a reflection above the known first discontinuous test interface; both graphs show two peaks both in the amplitude and in the phase, which are observable data that are recorded in the database and later compared with measurements during the excavation of the well by a classifier processor of the system; the five spectra have pore pressures of the second test formation between 181 bar and 280 bar, in particular it is possible to note an inverse relation between the position in frequency of peaks and dips of the five spectra that move at lower frequencies as the pore pressure of the second geological formation increases; the result is that it is possible to determine the pore pressure of the second test geological formation from the characteristic position in frequency of the peaks and dips.
Figure 6B:
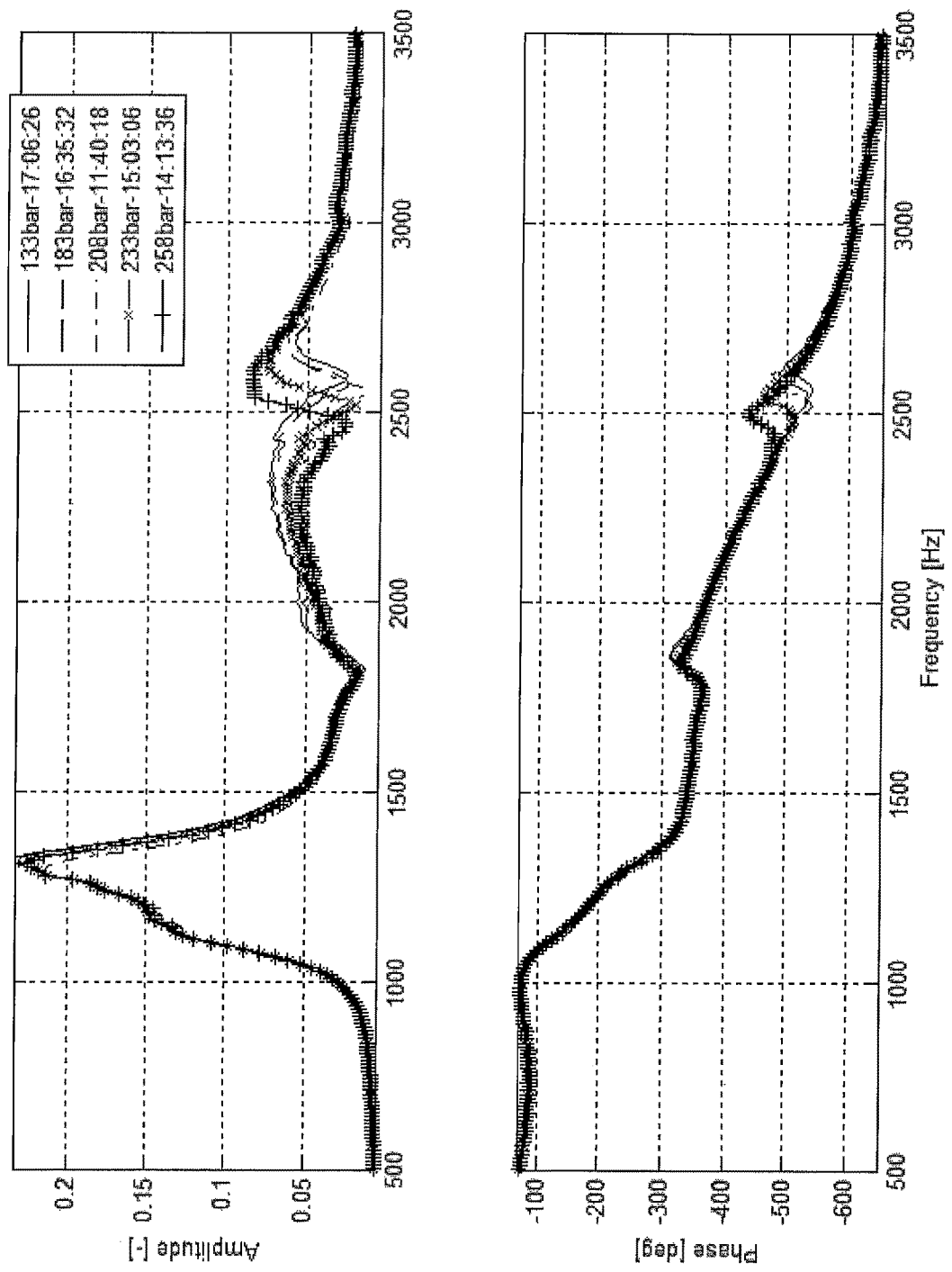
FIG. 6B shows two graphs of five overlapping response spectra of the receiving electro-acoustic transducer which are relative to a second test configuration between another first test formation and another second test formation which are known samples arranged in the test triaxial cell; the graphs are both as a function of a frequency range comprised between 500 and 4000 Hz; the top graph shows an amplitude and the bottom graph shows a phase of a signal received from a reflection above another first discontinuous test interface; the five spectra have pore pressures of the second test formation between 133 bar and 258 bar, in particular a dip or notch frequency is shown that moves at low frequencies as the pore pressure of the second geological formation increases; the result is that it is possible to determine the pore pressure of the second test geological formation from the position in frequency of the dip.

As shown in examples in FIGS. 6A and 6B, laboratory tests have allowed identifying which observable data are to be compared by the classifier processor 31 among those received from the system 100 and those measured in the laboratory with the triaxial cell 40 to determine the value of the pore pressure, and comprise frequencies of some peaks and some dips of the transfer functions corresponding to resonance frequencies, both for the amplitude module and for the phase. Such frequencies can be directly logged in pore pressure values.

The anomalous pressures at the pores corresponding to a collection of observable data which are a series of well-defined peaks and dips of the graphs 6A and 6B are known in the triaxial cell 40, thereby the classifier processor 31 is capable of comparing the peaks and the dips of the observable data in the database 33 and of comparing them with the measurements during the excavation, determining the pore pressure of the second geological formation 202 at depth level of the first discontinuous interface 210. These peaks and dips correspond to resonance frequencies. The peaks correspond to response maximums of the received signal and the dips correspond to response minimums of the received signal that are features of observable data. Other features of observable data that are signs of the pore pressure in the formation to be drilled in the Z(f) and H(f) spectra comprise resonance frequencies, amplitude of the peaks at the resonance, quqlity factor of the resonance, notch frequencies, both in the module and in the phase. Each collection of observable test data corresponds to a test known pore pressure value. The signatures of this collection of observable test data correspond to pressure values in the place of known test.

With respect to the model-based approach described above, this pattern recognition approach has the important advantage of not requiring the prior knowledge of auxiliary parameters, in particular those relative to the formation 201 in front of the bit, which are not always available by means of other types of measurement, such as for example seismic surface measurements.

The observable data of the database 33 preloaded in the memory 32 of the system 100 are obtained through measurements taken under laboratory conditions using a triaxial cell 40 or other similar apparatus.

As shown in FIG. 4, the triaxial cell 40 is a training apparatus, a so-called laboratory "training set" for the classifier processor 31. The training set comprises the transfer functions for training the classifier processor 31 and may be created by taking the measurements described above (discrete tones or Gaussian noise) under laboratory conditions. The triaxial cell 40 comprises two samples of rock formation 1 and formation 2 having metric sizes, arranged one above the other. Such cell 40 is to vertically compress the samples with a given stress to simulate the weight of the overlaying sediments.

The cell 40 is to radially compress the samples with a containment pressure (for example in oil) to simulate the horizontal stress exerted by the side sediments and to create different types of tensional states (for example oedometer, compressive tectonic, etc. which are known to the experts in the field).

The cell 40 is to inject a fluid (oil or water or gas) into the samples at the desired pressure (pore pressure).

The two transducers 20 are to be coupled to the first sample according to the methods indicated above in a chamber containing for example, water, at the desired pressure (which simulates the weight of the mud column).

The energy transmitted is to be regulated as a function of the depth "d" of the discontinuous test interface 24 to generate an equivalent response to the one of a first discontinuous interface 210 placed at distance "d" from the transducers 20 during the excavation of the well.

The energy transmitted is to be regulated in such a manner as to avoid the energy reflected from the bottom of the cell 40 to go back to the transducers 20, thus generating an artefact.

By using a sufficiently variegated set of pairs of formations 1, 2 (in terms of lithology, porosity, permeability, etc.) and varying the pore pressure for each combination, it is possible to obtain a training set to train the classifier processor 31.

The training set is formed in the following manner. In order to extract the pre-measured parameters from the cell 40 and enter them in the database 33 of the system 100, the space of the pore pressures is divided into ranges of convenient width (indicatively 10 bar). 4 frequency profiles are extracted (impedance module TX, impedance phase TX, response module in frequency RX, response phase in frequency RX) for each combination of pore pressure range applied and lithological parameters of the pair of formations associated with certain quantitative parameters of interest. Such parameters comprise resonance frequencies, amplitude of the peaks at the resonance, quality factor of the resonance, notch frequencies and other parameters.

Pre-processing techniques for reducing the redundancy of the information may possibly be applied to such obtained parameters, such as for example PCA (Principal Component Analysis).

The classifier processor 31 is then trained in the laboratory in this manner. In an initial training step, the parameters of interest indicated in the previous extraction step of the laboratory parameters (actual or transformed, by means of PCA, for example) with relative labels (that is pore pressure range and the lithological combination parameters) are used to calculate the coefficients of a classifier processor 31 that may apply a series of algorithms comprising algorithms for linear discriminant classifiers, K-Nearest Neighbour (KNN), Support Vector Machine (SVM), Neural Network.

In a successive step, the classifier processor 31 is applied to the measurements taken in real time during the drilling. Based on the coefficients of the classifier processor 31 calculated in the previous step, the classifier processor 31 classifies the measurements taken in the laboratory on a cell 40 comprising known formations 1 and 2 by estimating the lithological features of the formation 201 in front of the bit 10 and in particular, a plausible range of the relative pore pressure of the geological formation 201. The statistical recognition of the classifier processor 31 is supervised to implement the predictive reliability thereof.

Once the first discontinuous interface 210 is passed, the pressure is measured directly in situ by means of specific tools (such as for example, GeoTap by Halliburton) and the lithological features are analysed by means of LWD tools. A comparison between the measurements in situ and the prediction of the classifier processor 31 allows correcting and/or integrating the database 33 to continuously improve the performance of the classifier processor 31. FIG. 7 shows an algorithm of the process applied by the classifier processor 31 for estimating the pore pressure of the first discontinuous interface 210 according to the "pattern recognition" approach.

FIG. 8 summarizes the "pattern recognition" approach through the block flow chart, where starting from 800, the signal reflected 801 from the discontinuous interface is measured with anomalous pore pressure. If the reflected signal is not detected 802, then the drilling apparatus continues excavating 803, otherwise if the reflected signal is detected 804, the distance of the first discontinuous interface 210 is measured 805. The classifier processor 31 classifies 806 the measurements by comparing them with the database 33. The database 33 was created 810 through the training set of the triaxial cell 40 by extracting 811 predictive parameters that can be peaks and dips shown in FIGS. 6A and 6B for two configurations of formations 1, 2, 24. The classifier processor 31 is then trained 812.

After classifying 806 and estimating 808 the anomalous pore pressure, the classifier processor 31 updates 807 the database 33.

The training dataset, that is the database 33 for the classifier processor 31, is created by taking the measurements described under laboratory conditions. An example of measurement set-up is a triaxial cell containing two samples of rock (formation in which there is the bit and formation to be drilled) having metric sizes, arranged one above the other. Such cell is to: vertically compress the samples with a given stress to simulate the weight of the overlaying sediments; radially compress the samples with a containment pressure (for example in oil) to simulate the horizontal stress exerted by the side sediments and to create different types of tensional states (for example oedometer, compressive tectonic, etc. which are known to the experts in the field); inject a fluid (oil or water or gas) into the samples at the desired pressure (pore pressure). By using a sufficiently variegated set of pairs of formations (in terms of lithology, porosity, permeability, etc.) and varying the pore pressure for each combination, it is possible to obtain a training set to train the classifier. Such training set contains the parameter sets of interest, the so-called signatures or features, labelled with a given pore pressure range and a lithological description of the formation.

Figure 2B:
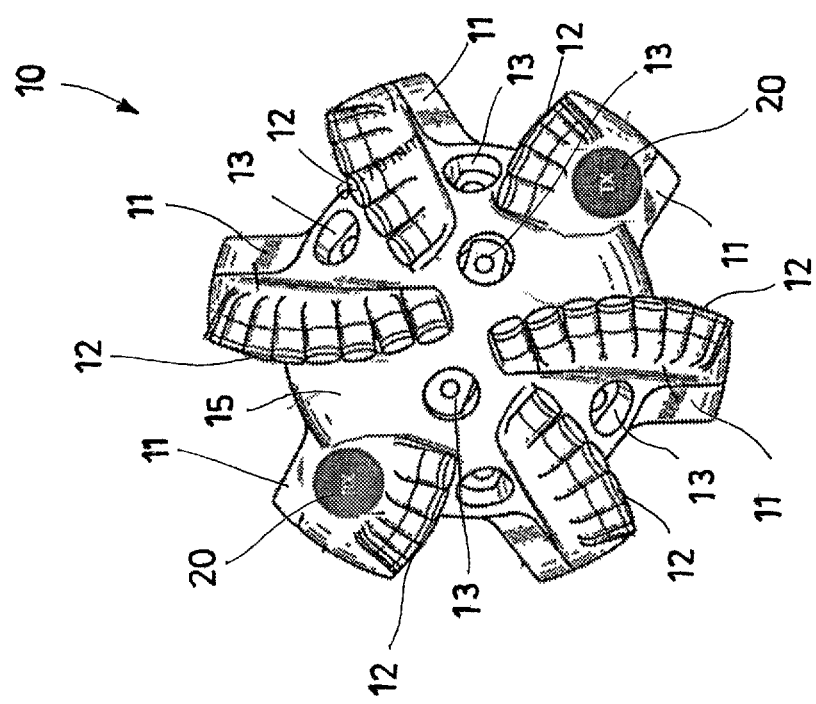
FIG. 2B is a view from below of an alternative bit which shows a face of the bit where electro-acoustic transducers are mounted.

Alternatively, it is possible to provide for the electro-acoustic transducers 20 to be mounted on the face 15 of the bit 10, as shown in FIG. 2B.

Again alternatively, it is possible for the electro-acoustic transducers 20 to be mounted on the portion of ridge 11 facing the rotation direction of the bit 10, between diamond-edged blades 12.

The disclosure thus conceived is susceptible to many modifications and variants, all falling within the same inventive concept; moreover, all the details can be replaced by technically equivalent elements. In practice, the materials used, as well as the dimensions thereof, can be of any type according to the technical requirements.

The invention claimed is:

1. A method for estimating a pore pressure value of a second geological formation at depth level of a first discontinuous interface between a first geological formation and a second geological formation arranged in succession at increasing depth, said first and said second geological formations are geological formations to be drilled by a drilling apparatus comprising at least one bit, wherein said method is implemented by a system comprising at least one electro-acoustic transducer mounted with said bit, at least one memory for containing observable data and at least one control processor and for processing observable data contained in said at least one memory, wherein said at least one processor controls said at least one electro-acoustic transducer to transmit a signal transmitted at a given frequency and to vary said given frequency within a predetermined range of frequency values, said at least one electro-acoustic transducer receives a received signal comprising a multiplicity of observable data measured as a function of said signal transmitted within said predetermined range of frequency values, said at least one control processor records said multiplicity of measured observable data in said at least one memory, said at least one control processor compares said multiplicity of measured observable data of the signal received with a respective multiplicity of pre-loaded observable data in said at least one memory, wherein said multiplicity of pre-loaded observable data also comprises a multiplicity of already-known anomalous pore pressure values that correspond to given series of observable data of said multiplicity of pre-loaded observable data, said at least one processor estimates the value of the anomalous pore pressure of the second geological formation at depth level of the first discontinuous interface, wherein said at least one processor analyses said multiplicity of measured observable data and identifies at least one feature of said multiplicity of measured observable data of the signal received, wherein said at least one feature comprises at least one spectrum maximum and/or minimum, at least one resonance frequency, at least one amplitude of resonance peaks, at least one quality factor of the resonance, at least one notch frequency, wherein said at least one feature is present in at least one spectrum of said multiplicity of measured observable data as a function of at least one frequency and/or as a function of at least one module and/or as a function of at least one phase, wherein said at least one processor compares said at least one feature of the signal received with respective features of pre-loaded observable data in said at least one memory.

2. The method according to claim 1, further including a step of measuring a distance between said at least one electro-acoustic transducer and the first discontinuous interface implemented by said at least one processor which estimates an outbound time of the transmitted signal and a return time of the received signal by identifying a cross-referenced correlation peak between the transmitted signal and the received signal or by identifying a beat frequency of a multiplication between the transmitted signal and the received signal.

3. The method according to claim 2, wherein before starting the step of measuring a distance between said at least one electro-acoustic transducer and the first discontinuous interface, the processor of the system determines the presence of the first discontinuous interface by controlling said at least one electro-acoustic transducer to transmit a known transmitted signal and by verifying that said at least one electro-acoustic transducer receives a received signal.

4. The method according to claim 1, wherein pre-loaded observable data in said at least one memory are measured through this method by said at least one processor of the system that measures the multiplicity of measured observable data of the signal received from said at least one electro-acoustic transducer, wherein said at least one transducer transmits the transmitted signal to a triaxial cell that comprises a first known formation and a second known formation, the first formation positioned above the second formation, said triaxial cell comprising means for injecting fluid into the formations to simulate a first known discontinuous test interface comprised between the first formation and the second formation subject to test anomalous pore pressure of which the value is known, reflected on said first discontinuous test interface is the signal transmitted in a reflected signal that propagates back until becoming the signal received from said at least one electro-acoustic transducer, said at least one processor records, in said at least one memory, the multiplicity of observable data of the test signal received and the value of the known test anomalous pore pressure, which become pre-loaded observable data.

5. The method according to claim 4, wherein before recording the multiplicity of observable data of the signal received from said triaxial cell, said at least one processor analyses said multiplicity of observable data and identifies said at least one feature of said multiplicity of observable data, said at least one processor records, in said at least one memory, said at least one feature of said multiplicity of observable test data that become pre-loaded observable data together with the known test anomalous pore pressure.

6. The method according to claim 1, wherein said at least one processor comprises a classifier processor that compares measured observable data of the signal received from said at least one electro-acoustic transducer and respective observable data pre-loaded in said at least one memory.

7. The method according to claim 1, wherein said at least one memory comprises a database comprising said pre-loaded observable data and in that said at least one processor loads said observable data measured by said signal received and said estimate of the anomalous pore pressure associated with said measured observable data in said database.

8. The method according to claim 1, wherein said at least one processor iteratively calculates a synthetic spectra generated by a pre-loaded predictive physical model starting from a pore pressure value, by modifying said value at each iteration starting from an initial value and recalculating the synthetic spectra until they are compared with the spectral measurements within a given threshold, thus obtaining the estimate of the pore pressure.

9. The method according to claim 1, wherein said at least one electro-acoustic transducer is in a layer of mud when it transmits and receives the signal.

10. The method according to claim 1, wherein said predetermined range of frequency values is comprised between 50 and 5000 Hz.

11. The method according to claim 1, wherein said at least one processor estimates the pore pressure of the second geological formation by means of a measurement of electric impedance in frequency Z(f) of said transmitting electro-acoustic transducer and/or a transfer function in frequency H(f) of a system comprising two transmitting and receiving electro-acoustic transducers and said first geological formation based on a predictive physical model in the domain of the frequency and/or based on pattern recognition techniques.

12. The method according to claim 11, wherein the predictive physical model comprises series of four sub-models comprising a pore pressure model that associates pore pressure of the formation to be drilled with the inelastic parameters of the second formation to be drilled, a visco-elastic constitutive model, an acoustic propagation model that describes the propagation in a stratified formation considering waves P, SV, SH and different modal conversions at the solid-solid and solid-fluid interfaces considering the inelastic and/or visco-elastic aspects by means of a suitable constitutive model of the geological formation to be drilled that provides an outlet radiation impedance of transmitter $Z_{RAD}(f)$ and a transimpedance $Z_{TR}(f)$ between transmitter and receiver, an electromechanical model of the electro-acoustic transducers that describes a conversion between electrical and mechanical quantities in the electro-acoustic transducers and that provides the output electrical impedance in frequency Z(f) and the transfer function in frequency H(f).

13. A system comprising at least one electro-acoustic transducer mounted with a bit of a drilling apparatus, at least one memory for containing observable data and at least one control processor and for processing observable data contained in said at least one memory, wherein said system implements the method according to claim 1.

14. The system according to claim 13, wherein said at least one electro-acoustic transducer is mounted with a ridge of the bit, wherein said ridge protrudes from a face of the bit of the drilling apparatus.

15. The system according to claim 13, wherein it comprises two electro-acoustic transducers of said at least one electro-acoustic transducer, one transmitting electro-acoustic transducer and one receiving electro-acoustic transducer.

* * * * *